Figure 1:
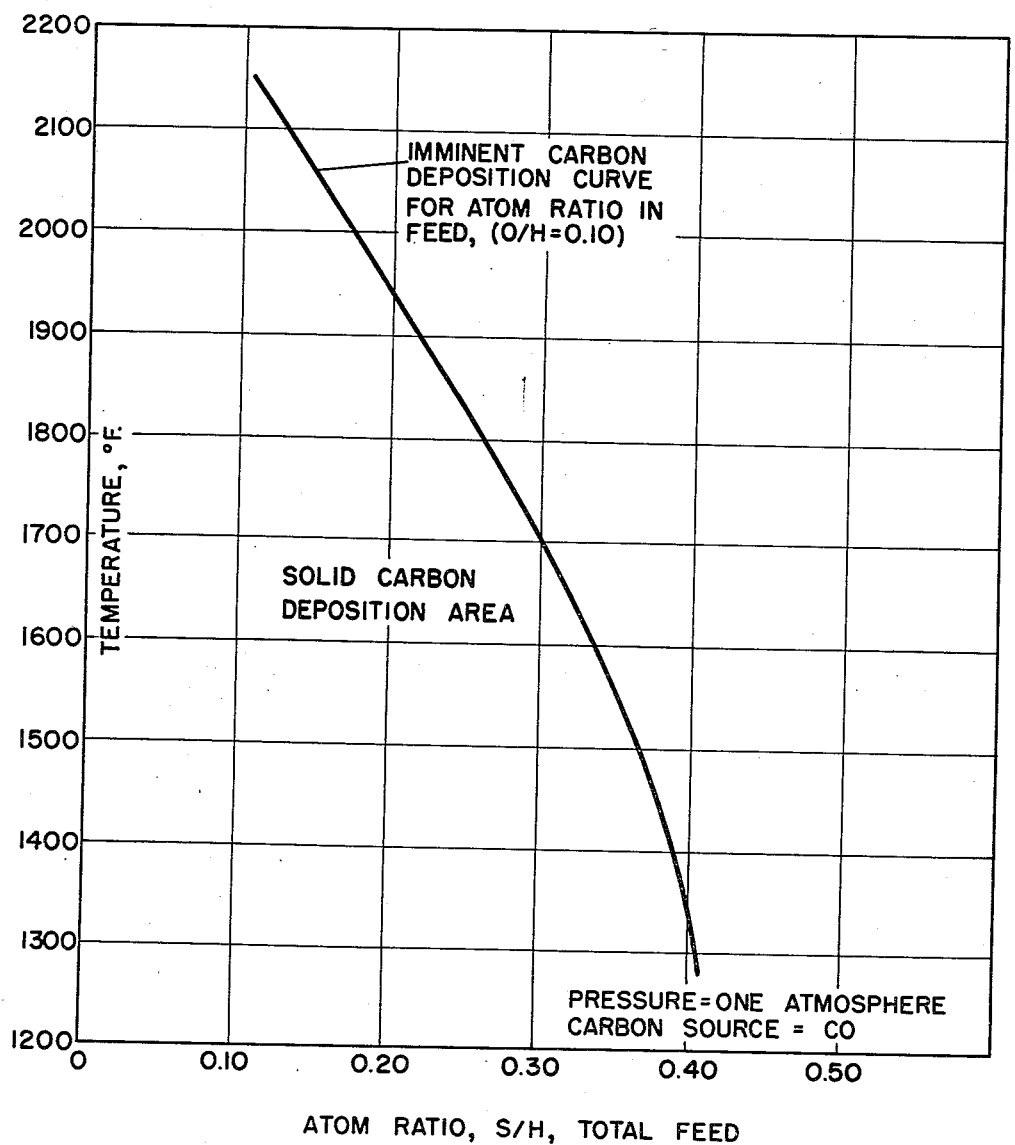

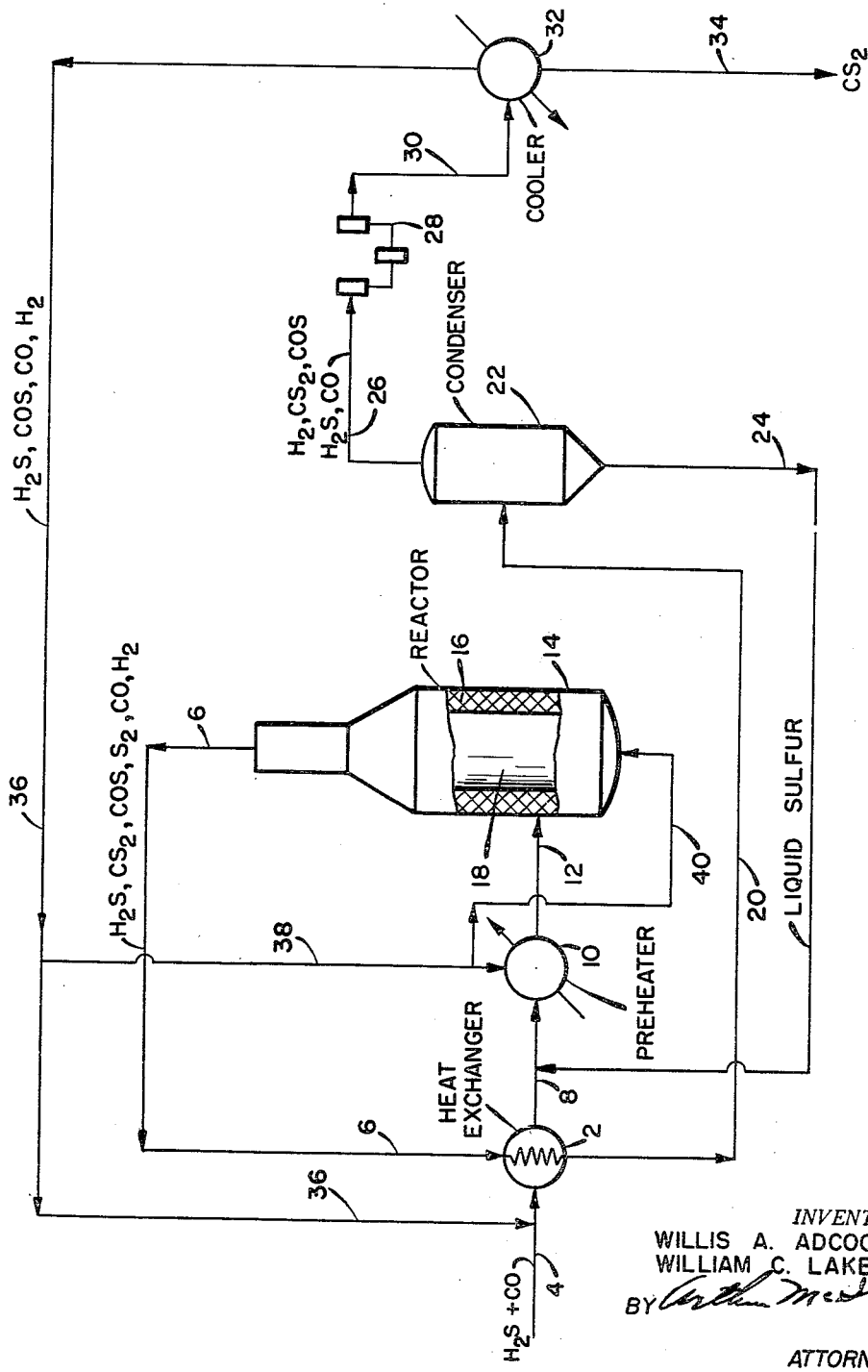

United States Patent Office 2,767,059
Patented Oct. 16, 1956

2,767,059

CARBON DISULFIDE MANUFACTURE

Willis A. Adcock, Dallas, Tex., and William C. Lake, Tulsa, Okla., assignors to Stanolind Oil and Gas Company, Tulsa, Okla., a corporation of Delaware Application May 29, 1953, Serial No. 358,353

10 Claims. (Cl. 23—206)

Our invention relates to a method for the preparation of carbon disulfide and carbonyl sulfide. More particularly, it is concerned with novel conditions employed in the manufacture of these compounds from gaseous mixtures containing hydrogen sulfide and carbon monoxide, or from compounds which—under the conditions used by the process of our invention—yield a gaseous mixture containing hydrogen sulfide and carbon monoxide or wherein such feed mixtures contain free sulfur, hydrogen, carbon and oxygen. In place of free carbon and oxygen in such mixtures, these materials may be present in the form of carbon monoxide.

In our copending applications U. S. Serial Numbers 352,417 and 352,418, filed May 1, 1953, dealing respectively with the formation of carbon disulfide from hydrogen sulfide and hydrocarbons and from free sulfur and carbon monoxide, carbon disulfide production is favored to a greater extent than is found to be the case when employing feed gases containing the four elements carbon, oxygen, sulfur and hydrogen. However, process complications and the availability of raw materials in a form most favorable for carbon disulfide and carbonyl sulfide production may require the use of a less desirable mixture of starting materials.

Accordingly, it is an object of our invention to provide a method by which carbon disulfide and carbonyl sulfide can be prepared from starting materials requiring a minimum of processing prior to their use in the involved method. It is another object of our invention to provide a procedure for making carbon disulfide and carbonyl sulfide which may be readily integrated into the operation of a natural gasoline plant processing sour natural gas. It is a further object of our invention to provide a method for preparing carbon disulfide and carbonyl sulfide from hydrogen sulfide containing gaseous streams, wherein such streams are not modified materially prior to their use in our process.

Broadly, our invention comprises reacting a gaseous mixture of compounds containing the elements carbon, oxygen, hydrogen and sulfur in varying ratios at temperatures ranging from about 1165° to about 2060° F. Specifically, the composition of the fresh feed employed in the process of our invention comprises hydrogen sulfide and carbon monoxide, or substances which will yield these compounds or their dissociation products under the reaction conditions employed. The conditions utilized are selected so that carbon deposition is imminent throughout the reaction, as we have found that yields of carbon disulfide are at a maximum when carbon deposition is on the verge of occurring. Operation of the reaction under conditions of impending carbon deposition is extremely important and any material variation from the oxygen-hydrogen ratio recommended herein results in a very substantial decrease in the formation of carbon disulfide. Thus, if the oxygen-hydrogen ratio decreases to a level below which carbon deposition is no longer impending, yields of the desired product drop off sharply. On the other hand, if the oxygen-hydrogen ratio is increased to a point where carbon deposition occurs to an appreciable extent, the activity of the catalyst is reduced to a level such that further operation is no longer economical. To accomplish the object of maintaining the system in a balance such that carbon deposition is imminent, a careful control of the sulfur-hydrogen and the oxygen-hydrogen ratios—as well as temperature—is required.

In connection with the foregoing discussion concerning carbon deposition, reference is made to Figure 1 in which the curve appearing therein shows the relationship of carbon deposition, in systems of the type herein involved, to sulfur-hydrogen atomic ratio and temperature at a constant oxygen-hydrogen ratio of 0.10. In essence, the curve indicates that as the atomic ratio of sulfur to hydrogen is increased, the temperature employed must be decreased in order to maintain the system in balance.

In the manufacture of carbon disulfide from feed mixtures containing hydrogen sulfide and carbon monoxide, we have found that maximum yields of this product can be secured by varying the sulfur-hydrogen or oxygen-hydrogen ratios over a given temperature range provide, of course, that within the particular combination of conditions selected, the system is maintained substantially at the point of imminent carbon deposition. In carrying out the process of our invention, the sulfur-hydrogen atomic ratio may range from about 0.15 to about 0.5, while the oxygen-hydrogen atomic ratio may vary from about 0.1 to about 2. In instances where the available feed possesses a high proportion of carbon monoxide to hydrogen sulfide, namely from about 2:1 to about 4:1, optimum yields of carbon disulfide are obtained at temperatures of from about 1165° to about 1700° F. Within this temperature range the oxygen-hydrogen atomic ratio varies from about 1 to about 2, and the ratio of oxygen to hydrogen required for a given set of conditions will be found to be a direct function of the temperature.

With systems in which the oxygen-hydrogen ratio is relatively low, i. e., from about 0.1 to about 0.3, sulfur-hydrogen atom ratios lower than 0.5 should be maintained in the reaction zone in order to operate at the point of imminent carbon deposition. Operation at a lower oxygen-hydrogen atomic ratio permits the use of a wider temperature range over which the reaction can be effected. Thus, for example, at a constant oxygen-hydrogen atomic ratio the sulfur-hydrogen atomic ratio may range from about 0.15 to about 0.4 over a temperature range of from about 1340° to about 2060° F., the sulfur-hydrogen ratio decreasing with increasing temperature. The proportion of sulfur to hydrogen may be conveniently decreased by addition of hydrogen to the system.

The catalysts which may be employed in carrying out the process of our invention comprise a relatively large group of compounds, including silica gel and the sulfides of zinc, calcium, cadmium, chromium, vanadium, titanium and the like. These materials may be used as such to promote the involved reaction where they may be placed on supports such as pumice, fuller's earth, various clays, etc., to constitute suitable catalysts. While it may generally be desirable to carry out the process of our invention in the presence of a catalyst, we do not consider it essential to do so in order to obtain carbon disulfide and carbonyl sulfide from sulfur and carbon monoxide in accordance with the novel conditions of operation set forth herein.

Space velocities used in the process of our invention may be varied within relatively wide limits with comparatively little change in the conversion secured. Maximum space velocities depend principally on the desired quantity of the reactants converted per pass. At a given temperature conversions decrease with increasing space velocities. However, conversions may be held substantially constant at increasing space velocities if the temperature is simultaneously increased. Under the conditions of our process, space velocities of from about 600 to about 3000 S. C. F. H. reactants per cubic foot of catalyst will generally be found satisfactory. When operating in the absence of a catalyst, residence times of the reactants in the reaction zone may vary from about 0.5 to about 1 second.

Inasmuch as pressure tends to reduce rather than increase the conversion to carbon disulfide, we prefer to carry out our process at substantially atmospheric pressure. Relatively slight increases in conversion are observed by using subatmospheric pressures, but from the standpoint of overall economy their use is not believed justified.

One of the outstanding features of our invention resides in the fact that it may be operated using sour natural gas as the feed. The methane present can be reformed with steam in a known manner to produce carbon monoxide and hydrogen, and the carbon monoxide or hydrogen—or both—may be added to the hydrogen sulfide stream, depending on the proportion of particular end products desired. The following tables indicate results which may be obtained with low sulfur-hydrogen ratios (Table I) or with high oxygen-hydrogen ratios (Table II), in the absence of a catalyst and within the ranges of reactant concentrations and temperatures set forth herein. The figures appearing in the tables show the concentration of corresponding components present in the tail gas. In Table I, specific figures are given only for operation at 1700° F.; at higher or lower temperatures the trend is indicated.

Table I

| Components of Reactor Tail Gas | Run 1,[1] 1,340° F. S/H Ratio=0.40, O/H and C/H Ratios=0.1 | Run 2,[1] 1,700° F. S/H Ratio=0.30, O/H and C/H Ratios=0.1 | Run 3,[1] 2,060° F. S/H Ratio=0.15, O/H and C/H Ratios=0.1 |
|---|---|---|---|
| | Mol percent | Mol percent | Mol percent |
| $H_2S$ | Increase | 44.0 | Decrease |
| CO | Decrease | 15.5 | Increase |
| $H_2$ | do | 37.0 | Do |
| $CS_2$ | Constant | 2.1 | Constant |
| COS | Increase | 0.9 | Decrease |
| $CO_2$ | do | 0.05 | Do |
| $S_2$ | Constant | 0.35 | Constant |
| $H_2O$ | do | 0.1 | Decrease |

[1] Atmospheric pressure.

Table II

| Components of Reactor Tail Gas | Run 1,[1] 1,340° F. S/H Ratio=0.5, O/H and C/H Ratios=1 | Run 2,[1] 1,700° F. S/H Ratio=0.5, O/H and C/H Ratios=2 |
|---|---|---|
| | Mol percent | Mol percent |
| $H_2S$ | 28.0 | 10.7 |
| CO | 44.5 | 72.0 |
| $H_2$ | 7.2 | 9.2 |
| $CS_2$ | 0.3 | 2.5 |
| COS | 8.2 | 4.2 |
| $CO_2$ | 10.0 | 0.9 |
| $S_2$ | 0.03 | 0.3 |
| $H_2O$ | 1.8 | 0.2 |

[1] Atmospheric pressure.

In Table I, at 1700° F., total feed conversion of carbon to carbon disulfide is 5 percent. However, the fresh feed conversion of carbon to carbon disulfide is practically 100 percent, since sulfur-containing products and unreacted hydrogen sulfide are recycled. Under such conditions very little fresh feed is required. The results given in Table II show how carbonyl sulfide production increases with decreasing temperature and how carbon disulfide falls off under the same conditions. At 1700° F., total feed conversion of carbon to carbon disulfide is about 3 percent, but the fresh feed conversion to carbon disulfide is practically 100 percent.

In operating under either set of conditions discussed above, it may be desirable to omit the recycle step, condense out the product water, sulfur, carbon disulfide and carbonyl sulfide and employ the uncondensed gases which contain from 10 to about 40 mol percent hydrogen sulfide as a raw feed for sulfur manufacture in a known manner.

For the production of carbonyl sulfide in maximum yields it is generally preferable to operate at somewhat lower temperature levels than are employed in the manufacture of carbon disulfide from feeds of the composition contemplated herein. Thus, carbonyl sulfide yields are observed to increase with sulfur-hydrogen atomic ratios that increase up to about 0.5, above which the carbonyl sulfide yields remain almost constant. Carbonyl sulfide production is also favored by increased oxygen-hydrogen ratios up to about 0.5 to about 1.0, beyond which the yield of carbonyl sulfide remains constant. Although carbonyl sulfide formation is favored to some extent by increased pressure, the economics of operation under such pressures in the preferred temperature range of about 1165° to about 1320° F. are not ordinarily justified. Within this temperature range a relatively pronounced maximum carbonyl sulfide yield is possible. Accordingly, the highest yields of carbonyl sulfide are secured with a feed having a sulfur-hydrogen ratio of about 0.5, an oxygen-hydrogen ratio of from about 0.5 to about 1.0, a pressure of about 1 atmosphere, a temperature of from about 1165° to about 1320° F. and a carbon-hydrogen atomic ratio such that carbon deposition is imminent. Under the above conditions, this ratio of carbon to hydrogen is about 1.0.

Thus with a feed of carbon monoxide and hydrogen sulfide, the table below indicates the conditions for optimum carbonyl sulfide production. Also, the effect of temperature on carbon disulfide production is illustrated.

Table IIA

| Components of Reactor Tail Gas | Run 1,[1] 1,320° F. S/H, O/H and C/H Ratio=0.5 | Run 2,[1] 1,700° F. S/H, O/H and C/H Ratio=0.5 |
|---|---|---|
| | Mol percent | Mol percent |
| $H_2S$ | 42.6 | 0.2 |
| CO | 33.5 | 42.0 |
| H | 8.9 | 16.5 |
| $CS_2$ | 1.2 | 5.8 |
| COS | 7.3 | 3.6 |
| $CO_2$ | 5.3 | 0.3 |
| $S_2$ | 0.1 | 0.6 |
| $H_2O$ | 1.1 | 0.2 |

[1] Atmospheric pressure.

The process of our invention will be more specifically illustrated by reference to the accompanying flow diagram in Figure 2 in which a feed consisting, for example, essentially of hydrogen sulfide and carbon monoxide (wherein the latter is present in a molar concentration of approximately four times that of the hydrogen sulfide) is fed to heat exchanger 2 through line 4. The cold feed (60° F.) is heated to a temperature of about 800° F. by heat exchange with the hot product gases in line 6. The resulting preheated feed is next brought up to reaction temperature (about 1700° F.) by introduction through line 8 into preheater 10. The hot feed is then sent through line 12 to reactor 14, lined with a suitable refractory material 16. Conversion of carbon monoxide and hydrogen sulfide to carbon disulfide and carbonyl sulfide occurs principally in reaction zone 18, which may or may not contain a bed of suitable catalyst. The resulting gaseous products of reaction are taken overhead through line 6 at a temperature of about 1700 ° F. and cooled by introduction thereof into heat exchanger 2, where said products come into indirect heat exchange with cool feed in line 4. The cooled gaseous products, at about 1000° F., are then sent through line 20 to condenser 22, where they are further cooled to a temperature of about 250° to 350° F. to separate liquid sulfur therefrom through line 24. The sulfur thus separated may be used in the principal reaction in reactor 14, and is sent to preheater 10 via line 24 where it is combined with the remainder of the hot feed. The uncondensed gases issuing from condenser 22, and consisting essentially of hydrogen sulfide, carbon monoxide, hydrogen, carbon disulfide and some carbonyl sulfide, are sent through line 26 to compressor 28 operated at about 300 p. s. i. g. The resulting compressed gases are withdrawn through line 30 and cooled in cooler 32 to a temperature of about 14° F., whereby approximately 80 percent of the carbon disulfide present is recovered through line 34. Uncondensed gases issuing from condenser 32 are recycled through line 36 to line 4, with a portion—e. g., 10 to 20 percent—being diverted through lines 38 and 40 to be employed as fuel for preheater 10 and reactor 14, respectively. Diversion of a portion of the recycle gas, as indicated above, is likewise desirable in order to maintain the oxygen-hydrogen ratio of the system at a value such that no substantial diversion from the carbon deposition point occurs. Operating under the above-described conditions, with 20 percent of the recycle being diverted as fuel, the recycle gas has the composition indicated below. Also, in this connection, the composition of the fresh feed, total feed and product gas streams are likewise indicated.

*Table III*

| Component | Fresh Feed | Recycle Gas | Total Feed | Product Gas |
|---|---|---|---|---|
| | Mol percent | Mol percent | Mol percent | Mol percent |
| $H_2S$ | 29 | 11.0 | 15.2 | 10.7 |
| $CO$ | 71 | 73.9 | 72.9 | 72.0 |
| $H_2$ | | 9.4 | 7.2 | 9.2 |
| $CS_2$ | | 0.5 | 0.4 | 2.5 |
| $COS$ | | 4.3 | 3.3 | 4.2 |
| $CO_2$ | | 0.9 | 0.7 | 0.9 |
| $S_2$ | | | 0.3 | 0.3 |
| $H_2O$ | | | | 0.2 |

If instead of the high carbon monoxide content feed employed in the description of the accompanying flow diagram (Figure 2), a feed in which the oxygen-hydrogen ratio is relatively low, i. e., from about 0.1 to about 0.3, is utilized at a temperature—for example—of about 1700° F., a recovery of 41 percent of the carbon disulfide present is secured at 32° F. and 200 p. s. i. g.; if it is desired to increase the pressure to the order of about 400 p. s. i. g., a 71 percent recovery of carbon disulfide is realized. As in the case of the high carbon monoxide content feed discussed above, it is likewise desirable to divert a portion—i. e., 10 to 20 percent—of the recycle stream in order to maintain the oxygen-hydrogen content of the system in proper balance. The diverted portion of the recycle may—if desired—be used as a fuel for the process. The composition of the various streams involved when employing a fresh feed having a relatively low carbon monoxide content is shown in the table appearing below.

*Table IV*

| Component | Fresh Feed | Recycle Gas | Total Feed | Tail gas |
|---|---|---|---|---|
| | Mol Percent | Mol Percent | Mol Percent | Mol Percent |
| $H_2S$ | 70 | 45.0 | 47.6 | 44.0 |
| $CO$ | 30 | 15.8 | 17.2 | 15.4 |
| $H_2$ | | 37.8 | 33.5 | 37.0 |
| $CS_2$ | | 0.5 | 0.45 | 2.1 |
| $COS$ | | 0.9 | 0.8 | 0.9 |
| $CO_2$ | | Trace | Trace | Trace |
| $S_2$ | | | 0.35 | 0.35 |
| $H_2O$ | | | | 0.10 |

In the procedure employing feed having a high carbon monoxide content, carbonyl sulfide—if desired—may be recovered by subjecting the gases in line 36 to increased pressure, i. e., 450 to 500 p. s. i. g., and withdrawing a stream rich in carbonyl sulfide in accordance with the procedure described in our copending application U. S. Serial No. 352,418, filed May 1, 1953.

Owing to the fact that the chemical properties of carbonyl sulfide and carbon disulfide are substantially the same, it will be apparent that by the process of our invention an appreciable amount of the starting materials employed are converted—in effect—into a single, usable, sulfur-containing end product. Thus, for example, carbonyl sulfide reacts similarly to carbon disulfide in the case of alcoholates, mercaptids, amines and the like. The advantage of such a process will be particularly appreciated if it is desired to consume the carbonyl sulfide and the carbon disulfide at the plant site for conversion into other sulfur-containing compounds.

From the foregoing description, it will likewise be apparent that the process of our invention is susceptible to numerous modifications without materially departing from the scope thereof. In general, it may be said that any procedure employing the novel principles set forth herein is intended to come within the spirit of our invention.

We claim:

1. In a process for the production of carbon disulfide, the improvement which comprises injecting into a reaction zone at a temperature of from about 1340° to about 1700° F. a gaseous feed comprising hydrogen sulfide and carbon monoxide, the atomic ratios of carbon-hydrogen and oxygen-hydrogen in said feed ranging from about 1 to about 2 and the sulfur-hydrogen ratio being not over about 0.5.

2. The process of claim 1 in which the ratio of carbon monoxide to hydrogen sulfide ranges from about 2:1 to about 4:1.

3. In a process for the production of carbon disulfide, the improvement which comprises injecting into a reaction zone at a temperature of about 1700° F. a gaseous feed consisting essentially of hydrogen sulfide and carbon monoxide, the atomic ratios of carbon-hydrogen and oxygen-hydrogen in said feed being about 2.

4. In a process for the production of carbon disulfide, the improvement which comprises injecting into a reaction zone at a temperature of about 1340° F. a gaseous feed consisting essentially of hydrogen sulfide and carbon monoxide, the atomic ratios of carbon-hydrogen and oxygen-hydrogen in said feed being about 1.

5. In a process for the production of carbon disulfide, the improvement which comprises injecting into a reaction zone at a temperature of from about 1340° to about 2060° F. a gaseous feed comprising hydrogen sulfide, carbon monoxide, and hydrogen wherein the ratio of sulfur to hydrogen ranges from about 0.15 to about 0.4 and the atomic ratios of oxygen-hydrogen and carbon-hydrogen range from about 0.1 to about 0.3.

6. In a process for the production of carbon disulfide, the improvement which comprises injecting a gaseous feed containing hydrogen sulfide and carbon monoxide into a reaction zone at a temperature of from about 1340° to about 2060° F. wherein the ratio of sulfur to hydrogen ranges from about 0.15 to about 0.5 and the carbon-hydrogen and oxygen-hydrogen atomic ratios vary from about 0.1 to about 2 to produce a hot gaseous mixture comprising carbon disulfide, free sulfur, hydrogen sulfide, carbon monoxide and hydrogen, passing said gaseous mixture in indirect heat exchange relationship with an additional portion of said gaseous feed, thereafter removing separately therefrom free sulfur and carbon disulfide to yield a remaining gaseous mixture comprising carbon monoxide, hydrogen sulfide and hydrogen, employing a portion of the latter as fuel to bring the temperature of the aforesaid reaction zone to the required level for conversion of said gaseous feed and recycling the remainder of said last-mentioned gaseous mixture as feed to the aforesaid reaction zone.

7. In a process for the production of carbon disulfide, the improvement which comprises injecting into a reaction zone at a temperature of from about 1340° to about 2060° F. a gaseous feed comprising hydrogen sulfide, carbon monoxide and hydrogen wherein the ratio of sulfur to hydrogen ranges from about 0.15 to about 0.4 and the atomic ratios of carbon-hydrogen and oxygen-hydrogen are about 0.1.

8. In a process for the production of carbonyl sulfide and carbon disulfide, the improvement which comprises injecting into a reaction zone at a temperature of from about 1165° to about 1320° F. a gaseous feed comprising carbon monoxide and hydrogen sulfide wherein the oxygen-hydrogen atomic ratio is from about 0.5 to about 1 and the carbon-hydrogen atomic ratio is about 1.

9. The process of claim 8 wherein the oxygen-hydrogen atomic ratio is about 0.5 and the carbon-hydrogen atomic ratio is about 1.

10. The process of claim 1 in which the temperature employed ranges from about 1165° to about 2060° F.

References Cited in the file of this patent

UNITED STATES PATENTS

| | | |
|---|---|---|
| 1,735,409 | Pier | Nov. 12, 1929 |
| 2,052,297 | Iddings | Aug. 25, 1936 |
| 2,141,768 | Silsby | Dec. 27, 1938 |
| 2,556,176 | Gamson | June 12, 1951 |

FOREIGN PATENTS

| | | |
|---|---|---|
| 293,172 | Great Britain | July 5, 1928 |
| 331,734 | Great Britain | July 10, 1930 |